Oct. 20, 1964 L. E. MADANSKY 3,153,782
ILLUMINATED INSTRUMENT PANEL
Filed Jan. 5, 1962 2 Sheets-Sheet 1

INVENTOR:
Leslie E. Madansky

Attorneys

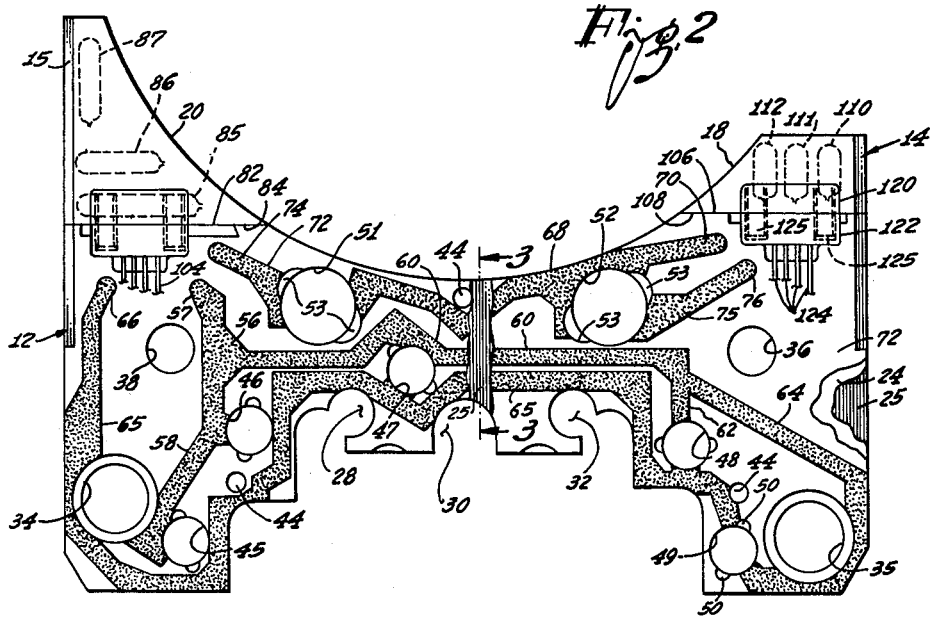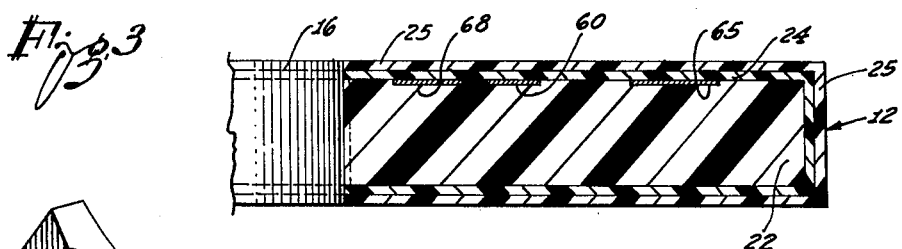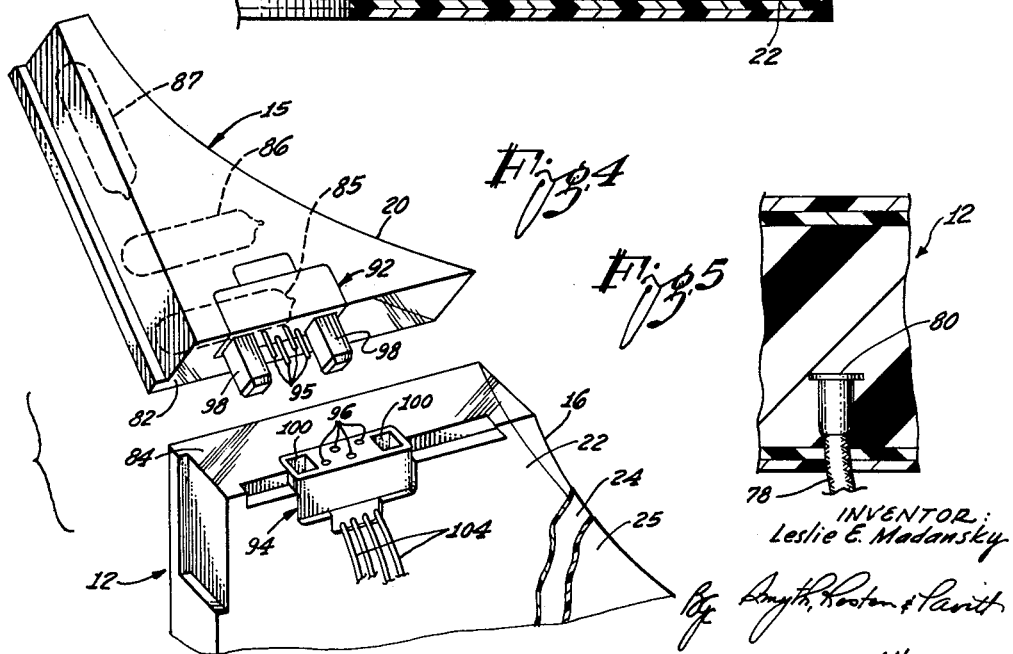

United States Patent Office 3,153,782
Patented Oct. 20, 1964

3,153,782
ILLUMINATED INSTRUMENT PANEL
Leslie E. Madansky, Burbank, Calif., assignor to California Plasteck, Inc., Los Angeles, Calif., a corporation of California
Filed Jan. 5, 1962, Ser. No. 164,475
6 Claims. (Cl. 340—366)

This invention relates to an illuminated instrument panel for use on an aircraft or the like wherein control components are associated with the panel for manipulation by an operator with corresponding illuminated indicia on the panel and wherein the panel is provided with a plurality of electrically actuated indicators to inform the operator of changing conditions including, for example, changes in the range of a distant object. The electrically actuated indicators to inform the operator of changing conditions may comprise suitable indicia adapted for illumination by corresponding individual indicator lamps.

While the invention is readily adapted for widely different uses, it has special utility for employment with an oscilloscope that provides a radar screen on a combat aircraft for guidance of the pilot in conjunction with the firing of missiles. This initial embodiment of the invention has been selected for the present disclosure and will enable those skilled in the art to apply the same principles to other specific purposes.

An illuminated panel for use with an oscilloscope in this manner incorporates a plurality of lamps for general illumination of the panel and incorporates conductors, usually printed circuit conductors, for energizing the general illumination lamps and for connecting certain electrical control components on the panel with sources of current. The general illumination of the panel is reliable because of the plurality of lamps since one or more of the plurality of lamps may fail without seriously lowering the illumination level. The printed circuitry for the electrical control components is also reliable.

Failure of any one of the indicator lamps, however, is a serious matter that may fatally jeopardize a mission. It is of primary importance, therefore, to enable the pilot to replace a defective indicator lamp easily and quickly whenever the occasion arises.

One problem is to make the indicator lamps conveniently accessible for replacement. It is not desirable to make the lamps replaceable from the front of the panel, however, because the whole area of the front side of the panel is crowded with the required control components and the indicia associated therewith. On the other hand the back side of the panel is not sufficiently accessible for replacement of a small signal lamp by the pilot. Another problem is presented by the fact that the indicating lamps are necessarily of miniature size and it is asking too much to require a pilot burdened with flight problems and combat problems to remove a lamp and correctly replace the lamp when the lamp is smaller than a small pea. A further difficulty in this respect is that making an individual lamp readily releasable from the panel reduces reliability whereas reliability is increased by permanently incorporating an indicator lamp in the panel structure, for example, by potting the lamp in the panel.

The present invention meets all of these problems and difficulties and not only makes the indicator lamps easily and quickly replaceable but also provides all of the advantages of permanently incorporating the indicator lamps in the panel structure. Generally described, the invention accomplishes this purpose by dividing the instrument panel into a relatively large permanently installed main panel body and one or more smaller auxiliary panel bodies, the smaller auxiliary panel bodies plugging into the main panel body edgewise thereof in a quickly releasable and replaceable manner.

In the preferred practice of the invention, the assembled panel is located just under the cathode ray tube and has an arcuate edge that extends in both directions from the underside of the tube upward along the curved edge of the tube to the two opposite sides of the tube. Thus the overall configuration of the assembled panel is of the general shape of a rectangle with parallel opposite sides and with an arcuate sector removed from the upper side of the rectangle to permit the panel to conform to the curvature of the cathode ray tube in close proximity to the tube.

This configuration provides the assembled panel with two tapered portions or horns at its upper left and upper right corners and these two horns are releasable and replaceable auxiliary panel bodies that are mounted edgewise on the main panel body. The main panel body incorporates the electrical elements which are not critical and ordinarily do not fail, including the lamps for general illumination of the panel and circuitry associated with the adjustable control components. The indicator lamps for giving information about changing conditions are permanently incorporated in the structure of the two auxiliary panel bodies. There is a plurality of indicator lamps in each of the two auxiliary panel bodies and if any one of the plurality of indicator lamps in one of the two auxiliary panel bodies fails the whole auxiliary panel body is immediately discarded and replaced.

In accord with this concept, all of the exterior wires for energizing the indicator lamps of the two auxiliary panel bodies and for connecting the individual indicator lamps to remote control devices are permanently connected to the main panel body. In the present embodiment of the invention, the terminals of two bundles of external wires are potted into the main panel body adjacent the two removable auxiliary panel bodies respectively.

A pair of mating quickly releasable multiple contact electrical connectors is provided at each of the two junctures of an auxiliary panel body with the main panel body, one connector of each pair being incorporated in the edge of the auxiliary panel body and the other connector of the pair being incorporated in the corresponding edge of the main panel body. In this instance the electrical connectors incorporated in the two auxiliary panel bodies have multiple pin contacts and the complementary electrical connectors incorporated in the main panel body have corresponding socket contacts.

A feature of the preferred practice of the invention is the provision of releasable dowel means for mechanically connecting the two auxiliary panel bodies to the main panel body, instead of relying on the electrical pin contacts for support of the auxiliary panel bodies. In the present construction, two dowel pins are permanently on each auxiliary panel body in the manner of fixed studs. The two dowel pins flank the pin contacts on the auxiliary panel body and the two dowel pins have tapered ends of facilitate entry into corresponding dowel sockets on the main panel body. In this regard, a feature of the invention is that the two dowel pins are substantially longer than the associated pin contacts so that the two dowel pins enter the two corresponding dowel sockets before the pin contacts reach the pin sockets. Thus the dowel pins serve as guides to insure that the pin contacts approach the socket contacts in a manner that prevents damage to the pin contacts.

The features and advantages of the invention may be understood from the following detailed description and the accompanying drawings.

In the drawings, which are to be regarded as merely illustrative:

FIG. 2 is a plan view of the bottom or back side of the panel with outer layers of the panel removed to expose the printed circuit conductors of the panel;

FIG. 3 is an enlarged section of the main panel body taken along the line 3—3 of FIG. 2;

FIG. 4 is a fragmentary perspective view showing one of the two auxiliary panel bodies poised for plugging into the main panel body; and FIG. 5 is a fragmentary view showing how the terminal of an external insulated wire may be potted into the material of the main panel body.

Figure 1:
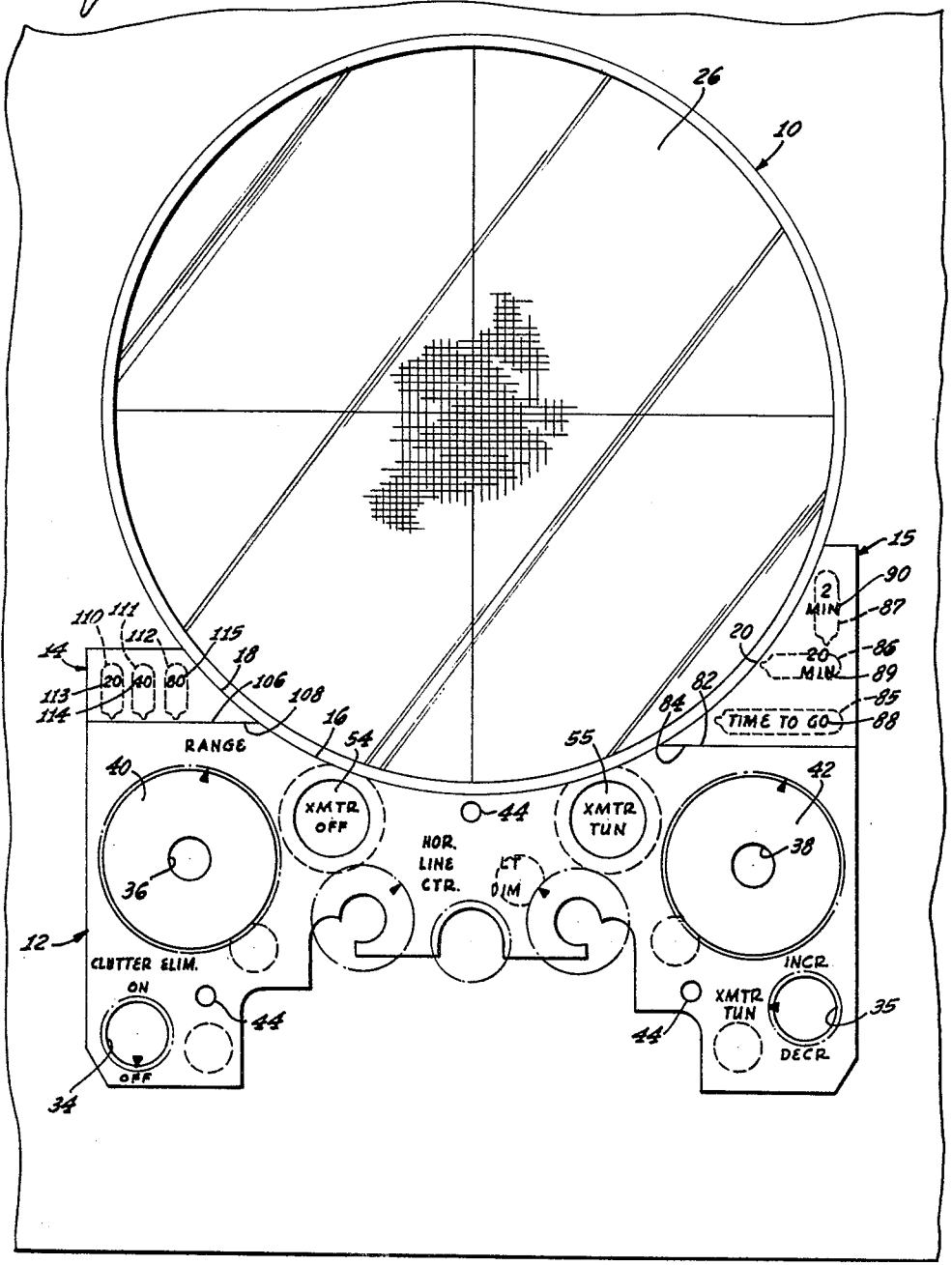
FIG. 1 is a plan view of the presently preferred embodiment of the instrument panel with the associated adjustable control components omitted.

FIG. 1, illustrating the presently preferred embodiment of the invention, shows an edge-lighted panel assembly for use with a cathode ray tube 10, the panel assembly comprising a main panel body 12 and two auxiliary panel bodies 14 and 15. The panel assembly follows the curvature of the cathode ray tube 10, the main panel body having an arcuate edge 16 which is continued by an arcuate edge 18 of the auxiliary panel body 14 and an arcuate edge 20 of the auxiliary panel body 15.

Each of the three panel bodies 12, 14 and 15 is of a well-known laminar construction shown in section in FIG. 3. The laminar construction comprises a relatively thick main layer 22 of clear or transparent plastic, an intermediate layer 24 of translucent plastic, and an outer enveloping layer 25 of opaque plastic. The outer opaque layer 25 has cut outs forming letters, numerals and other indicia. The translucent intermediate layer 24 may be colored, for example, red or green, to color the indicia.

The cathode ray tube 10 provides a circular radar screen 26. This radar screen is used in conjunction with the panel assembly for aiming and timing missiles to be launched from the aircraft.

The main panel body 12 is suitably recessed and apertured for various control components or shafts for such components. Thus the main panel body has three recesses 28, 30 and 32 in its lower edge, and two circular apertures or bores 34 and 35 in its lower left and lower right corners respectively. The main panel body 12 also has an aperture or bore 36 in its left half and an aperture or bore 38 in its right half for shafts that are provided with knobs of relatively large diameter (not shown) for manual operation. These relatively large knobs are illuminated from the interior of the main panel body and for this purpose the outer opaque layer 25 and the intermediate translucent layer 24 of the main panel body are omitted to expose the main transparent layer 22 over a circular area 40 around the bore 36 and a circular area 42 around the bore 38. In addition the main panel body 12 is provided with three small bores 44 to receive fastening devices such as screws for mounting the panel assembly.

For general illumination of the main panel body 12, the panel has five recesses in the form of blind bores 45, 46, 47, 48 and 49 on the rear side of the panel, the bores stopping short of the front face of the panel. These five bores are adapted to receive miniature lamp bulbs (not shown). In this instance each of the blind bores 45–49 is provided in a well known manner with a pair of diametrically opposite recesses 50 to receive mounting wings of plastic bodies (not shown) that fit into the blind bores, the plastic bodies enclosing lamp bulbs for transillumination of the main transparent layer 22 of the panel body.

The rear side of the main panel body 12 is further provided with a pair of apertures in the form of larger blind bores 51 and 52 to receive indicator lamps. Here again the blind bores 51 and 52 have diametrically opposite recesses 53 to cooperate in the mounting of plastic bodies that fit into the blind bores and enclose suitable indicator lamps.

Referring to FIG. 1 which shows the front face of the panel assembly, the indicating lamp in the blind bore 52 illuminates indicia 54 to indicate that the transmitter (not shown) is turned on and the lamp in the blind bore 51 illuminates indicia 55 to indicate that the transmitter is ready for tuning. Various other indicia shown on the front side of the main panel body 12 are visible because of the general illumination by lamps in the five blind bores 45–49.

In the present embodiment of the invention, printed circuit conductors of the pattern shown in FIG. 2 are incorporated in the structure of the main panel body 12 on the back side thereof. One printed circuit conductor 56 having an end 57 for connection to one side of an E.M.F. source has a portion 58 adjacent one side of each of the blind bores 45 and 46, a second portion 60 adjacent one side of the third blind bore 47, a third portion 62 which extends adjacent the fourth blind bore 48 and a fourth portion 64 which skirts the bore 35 to extend to one side of the fifth blind bore 49.

One side of each of the general illumination lamps in the blind bores 45–49 is connected to this printed circuit conductor 56. To complete the circuit for the general illumination lamps in the five blind bores 45–49, a second printed circuit conductor 65 having an end 66 for connection to external circuitry, extends along the second side of each of the five blind bores. A suitable remote switch in this circuit controls the energization of the five lamp bulbs in the five blind bores.

In like manner, suitable printed circuit conductors are provided for the indicator lamps in the two blind bores 51 and 52. One printed circuit conductor 68 having an end 70 for connection to external wiring extends alongside the two bores 51 and 52. A printed circuit conductor 72 having an end 74 for connection to external wiring extends to the second side of the blind bore 51 and a printed circuit conductor 75 having an end 76 for connection to external wiring extends to the second side of the blind bore 52.

Preferably, the various printed circuit conductors are pressed into the main transparent plastic layer 22 out of the planes of the translucent layer 24. Thus FIG. 3 shows how the printed circuit conductors 65 and 68 are offset into the clear plastic layer 22.

It is apparent that a remote switch in the circuit across the printed conductor ends 57 and 74 will control the indicator lamp in the blind bore 51 and a remote switch across the printed conductor ends 70 and 76 will control the indicator lamp in the second blind bore 52. FIG. 5 shows how an external insulated wire 78 may be potted in the main panel body 12 for electrical connection with a printed circuit conductor of the panel. The insulated wire 78 has a metal terminal ferrule 80 that is embedded in the clear plastic layer 62 for contact with a corresponding printed circuit conductor of the panel.

The auxiliary panel body 15 is of the same laminar construction as the main panel body 12, being completely encased in an outer layer of opaque plastic material and, as best shown in FIG. 4 has a straight planar edge 82 which abuts a corresponding co-extensive straight planar edge 84 of the main panel body 12. Three miniature indicator lamp bulbs 85, 86 and 87 are enclosed in the auxiliary panel body 15 to illuminate three corresponding indicia 88, 89 and 90 (FIG. 1) to indicate the computed range of a target from the aircraft. These three indicator lamp bulbs are connected to a multiple contact electrical connector generally designated 92, that is embedded in the auxiliary panel body 15 adjacent the edge 82. The electrical connector 92 mates with a complementary multiple contact electrical connector 94 that is embedded in the main panel body 12 adjacent the planar edge 84.

In the construction shown the electrical connector 92 has four pin contacts 95 which removably enter four corresponding socket contacts 86 of the complementary connector 94. One terminal of each of the three indicator lamp bulbs 85, 86 and 87 is connected to one of the pin contacts 95 and the other terminals of the three indicator lamp bulbs are connected to the other three pin contacts 95 respectively.

As heretofore stated, a feature of this embodiment of the invention is the use of projections such as dowel pins or studs and complementary sockets for mechanically interconnecting the auxiliary panel 15 and the main panel 12 to avoid relying on the relatively delicate pin contacts 95 for support of the auxiliary panel body. In the construction shown, two dowel pins 98 of square cross sectional configuration, are rigidly mounted on the auxiliary panel body 15 on opposite sides of the group of four connector pins 95, the two dowel members being unitary with the electrical connector 92. The complementary electrical connector 94 is formed with two dowel sockets 100 of square cross sectional configuration to receive the two dowel pins 98 in a snug manner. In this instance, the dowel pins 98 are substantially longer than the pin contacts 95 and are of tapered configuration, the leading ends of the dowel pins being chamfered as indicated at 102.

The taper at the leading ends of the dowel pins 98 facilitates entry of the dowel pins into the dowel sockets 100 and the extra length of the dowel pins insures that the dowel pins will be partially inserted into the dowel sockets 100 before the pin contacts 95 enter the socket contacts 96. Thus the dowel pins 98 serve as guides for the entry of the pin contacts 95 into the socket contacts 96 and assure that the approach of the pin contacts will be accurately aligned with the socket contacts. It is apparent that the dowel pins 98 protect the pin contacts 95 against damage in the operation of plugging the auxiliary panel body 15 into the main panel body 12 and also serve as guards to afford some degree of protection against damage of the pin contacts when the auxiliary panel body is separated from the main panel body.

A group of four external wires 104 is connected to the complementary electrical connector 94 as best shown in FIG. 4, the four wires being electrically connected respectively to the four socket contacts 96. The ends of these four wires may be potted in the previously described manner illustrated by FIG. 5.

The other auxiliary panel body 14 is of the same construction as the auxiliary panel body 14, having a straight planar edge 106 that abuts a corresponding straight planar edge 108 of the main panel body 12. The auxiliary panel body 14 encases three indicator lamp bulbs 110, 111 and 112 to illuminate three corresponding individual indicia 113, 114 and 115. In the previously described manner, the three lamp bulbs 110–112 are connected to four pin elements (not shown) of a multiple contact electrical connector 120 that is embedded in the auxiliary panel body 14 adjacent the planar edge 106. The electrical connector 120 mates with a complementary electrical connector 122 in the adjacent planar edge 108 of the main panel body 12 and the four socket contacts (not shown) of the complementary connector are connected respectively to the four wires 124 of a bundle of wires that terminate at the complementary connector. In the manner heretofore described, the electrical connector 120 has a pair of dowel pins 125 indicated in dotted lines in FIG. 2 that removably enter corresponding dowel sockets in the complementary connector.

The manner in which the invention serves its purpose may be readily understood from the foregoing description. It is apparent that the external wires 104 that terminate at the electrical connector 94 of the main panel body 12 control energization of the three indicator lamps 85, 86 and 87 of the auxiliary panel body 15 and the four wires 124 that are connected to the complementary connector 122 of the main panel body control energization of the three indicator lamp bulbs 110, 111 and 112 of the auxiliary panel body 14. If any one of the three indicator lamp bulbs of an auxiliary panel body 14 or 15 should fail at a critical time, it is a simple matter for the pilot to jerk the auxiliary panel body free from the main panel body and replace the auxiliary panel body with no loss of time. Ordinarily, it would require some fumbling to register the four pin contacts of an auxiliary panel body with the four corresponding socket contacts of the main panel body but the relatively large dowel pins with their tapered leading ends may be easily and quickly registered with the corresponding dowel sockets thereby to bring the pin contacts into accurate alignment with the corresponding socket contacts. It will also be appreciated that in the event it becomes desirable to change the indicia or arrangement of indicator lamps on one of the auxiliary panel bodies 14 and 15, it is a simple matter to replace the auxiliary panel body with a newly designed auxiliary panel body.

My description in specific detail of the selected embodiment of the invention will suggest various changes, substitutions and other departures from my disclosure within the spirit and scope of the appended claims.

I claim:

1. A panel for mounting adjacent the large circular end of a cathode ray tube to indicate conditions for guidance of an operator and for use with adjustable control components to be manipulated by the operator, comprising:

a main panel body having an arcuate edge to conform with said circular end of the cathode ray tube in close proximity thereto on the underside of the tube;

two tapered auxiliary panel bodies adjacent to the opposite sides respectively of said end of the tube; and having arcuate edges continuous with opposite ends of said arcuate edge of the main panel body, said auxiliary panel bodies being positioned edge to edge with the main panel body and being releasably connected to the main panel body for convenient replacement of the auxiliary panel bodies;

electrically actuated condition indicators on said auxiliary panel bodies;

exterior wiring connected to said main panel body to control said indicators;

a multiple-contact electrical connector on each of said auxiliary panels connected to the indicators thereon; and two complementary multiple contact electrical connectors on said main panel body connected with said exterior wiring and releasably connected with said electrical connectors respectively of the two auxiliary panel bodies for energization of the condition-indicators.

2. A combination as set forth in claim 1 in which the two electrical connectors on the auxiliary panel bodies have pin contacts and the two electrical connectors on the main panel body have socket contacts to receive the pin contacts.

3. A combination as set forth in claim 2 in which said auxiliary panel bodies have anchoring projections and said main panel body has corresponding sockets to receive said projections for anchoring the auxiliary panel bodies on the main panel body, said projections being longer than said pin contacts to guide the pin contacts into the corresponding socket contacts.

4. An illuminated instrument panel assembly for use with adjustable controls to be manipulated by an operator and for indicating conditions for guidance of the operator, comprising in combination:

a fixedly supported main panel body providing the major portion of the front surface of the assembly, said main body having recesses and indicia for control components and having lamp means to illuminate the indicia, said main body having circuit conductors including conductors to energize the lamp means;

exterior wires connected to the main panel body to energize the circuit conductors thereon;

at least one auxiliary panel body contiguous to the main panel body with edges of the two panel bodies confronting each other, said auxiliary panel body providing a minor portion of the front surface of the assembly, said auxiliary panel body having electrically operated condition-indicators for guidance of the operator, one of said panel bodies having a plurality of mounting sockets in the corresponding confronting edge of the body with the axes of the sockets parallel to the surface of the assembly, the other of said panel bodies having a plurality of rigid mounting prongs on its confronting edge parallel to said surface and releasably fitting into said mounting sockets respectively for support of the auxiliary panel body by the main panel body;

a first multiple-contact electrical connector incorporated in the confronting edge of the main panel body and connected to the circuit conductors of the main panel body; and a second multiple-contact electrical connector incorporated in the confronting edge of the auxiliary panel body, one of the two connectors having socket contacts, the other of the two connectors having pin contacts to mate with the socket contacts for energization of said condition-indicators whereby failure of a condition-indicator may be remedied by removal and replacement of the auxiliary panel body, said pin contacts being shorter than said mounting prongs whereby initial insertion of the mounting prongs into the mounting sockets aligns the pin contacts with the socket contacts to prevent damage of the pin contacts.

5. A combination as set forth in claim 4 in which said mounting prongs have tapered leading ends to facilitate entry thereof in the corresponding mounting sockets.

6. In an illuminated instrument panel for use with adjustable controls to be manipulated by an operator and for indicating conditions for guidance of the operator, wherein the panel has recesses and indicia for control components, lamps to illuminate the indicia and wherein the panel is further provided with condition-indicating lamps, the panel having circuit conductors connected to said illuminating lamps and said condition-indicating lamps, the panel having circuit conductors connected to said illuminating lamps and said condition-indicating lamps, the panel being connected to external wiring to energize the circuit conductors, the improvement for quick replacement of the condition-indicators comprising:

the panel being divided into a main panel body providing the major surface area of the panel and an auxiliary panel body providing a minor portion of the panel, said condition-indicators being on the auxiliary panel body, said auxiliary panel body being releasably mechanically connected to the main panel body along one edge thereof with a portion of the circuit conductors on the auxiliary panel body for energization of the condition-indicating lamps thereon, a multiple-contact connector at said edge of the main panel body connected to the circuit conductors on the main panel body; and a multiple-contact electrical connector on the auxiliary body for cooperation with the multiple-contact connector on the main body for energization of the condition-indicating lamps whereby failure of any of the condition-indicating lamps may be remedied by disconnecting the auxiliary panel body and replacing the auxiliary panel body with a new auxiliary panel body.

References Cited in the file of this patent

UNITED STATES PATENTS

| | | |
|---|---|---|
| 3,015,718 | Petri | Jan. 2, 1962 |
| 3,065,335 | Madansky | Nov. 20, 1962 |